Figure 1:
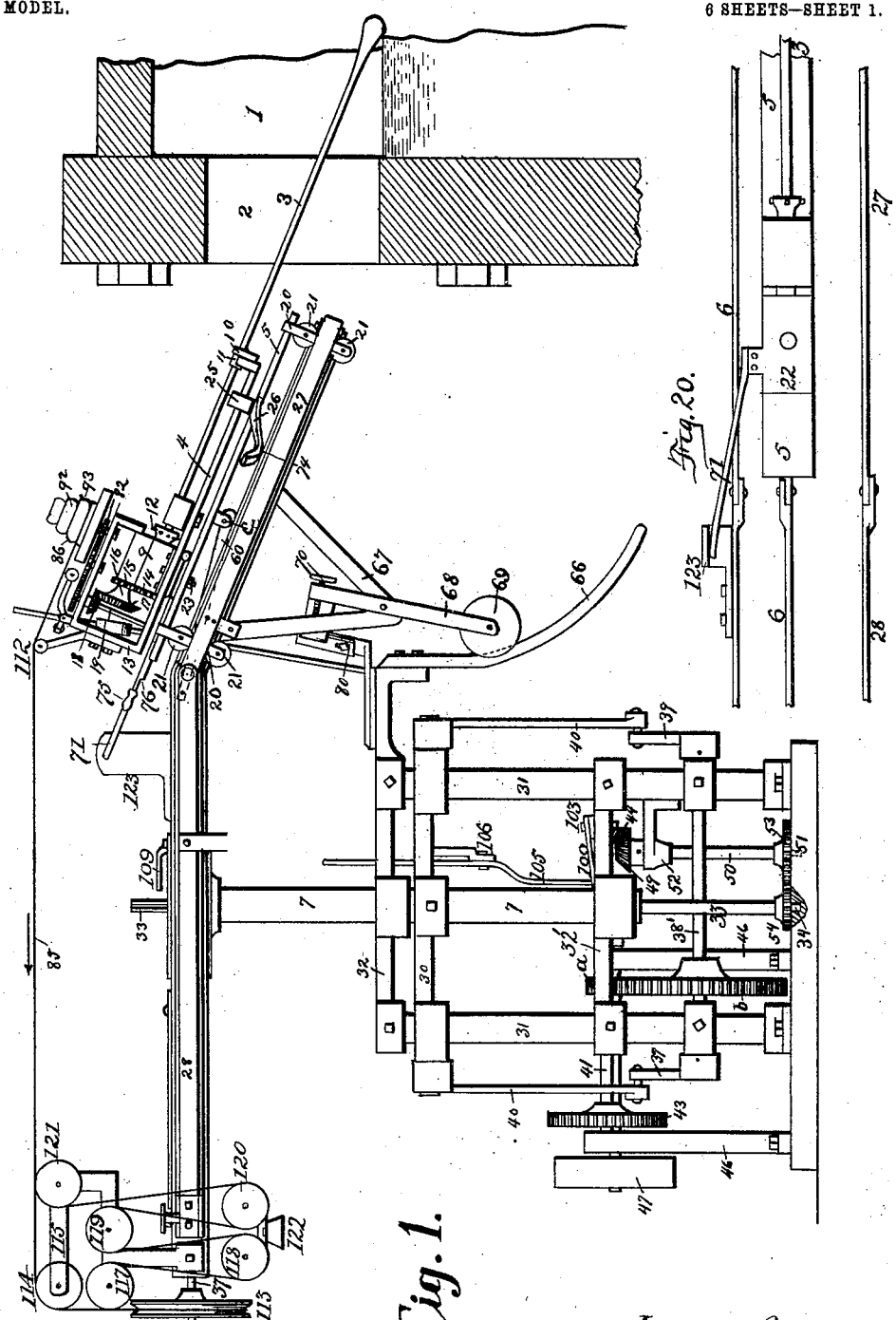

No. 744,274. PATENTED NOV. 17, 1903.
W. F. ALTENBAUGH.
MACHINE FOR AUTOMATICALLY GATHERING AND DELIVERING GLASS.
APPLICATION FILED MAR. 14, 1900.
NO MODEL. 6 SHEETS—SHEET 1.

Witnesses:

Inventor:
William Francis Altenbaugh
by Johnson & Johnson
Attorneys

No. 744,274. PATENTED NOV. 17, 1903.
W. F. ALTENBAUGH.
MACHINE FOR AUTOMATICALLY GATHERING AND DELIVERING GLASS.
APPLICATION FILED MAR. 14, 1900.
NO MODEL. 6 SHEETS—SHEET 2.
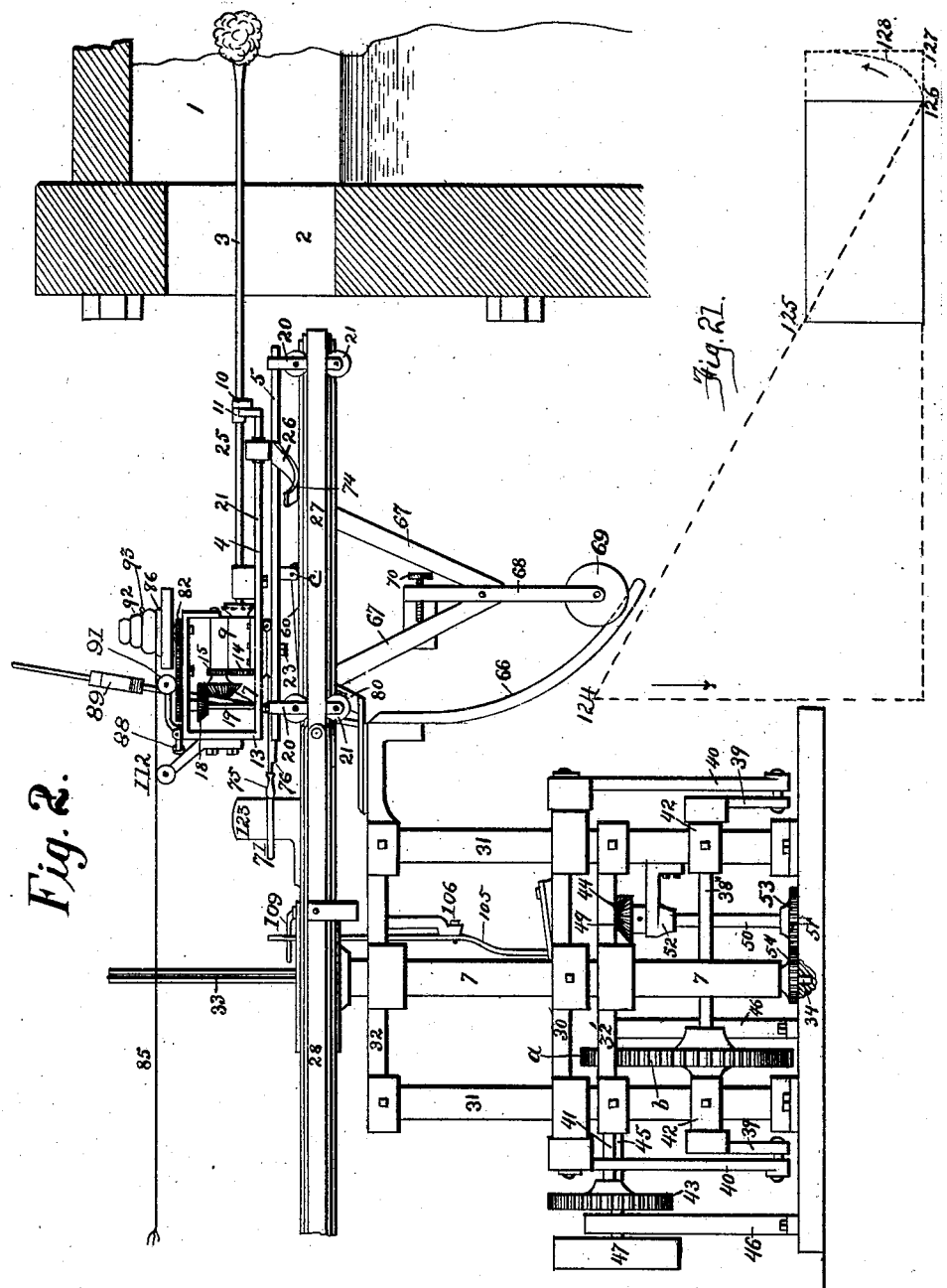
Witnesses.
H. S. Austin.
John E. Burch.
Inventor.
William Frances Altenbaugh
by Johnson and Johnson
Attorneys No. 744,274. PATENTED NOV. 17, 1903.
W. F. ALTENBAUGH.
MACHINE FOR AUTOMATICALLY GATHERING AND DELIVERING GLASS.
APPLICATION FILED MAR. 14, 1900.
NO MODEL. 6 SHEETS—SHEET 3.
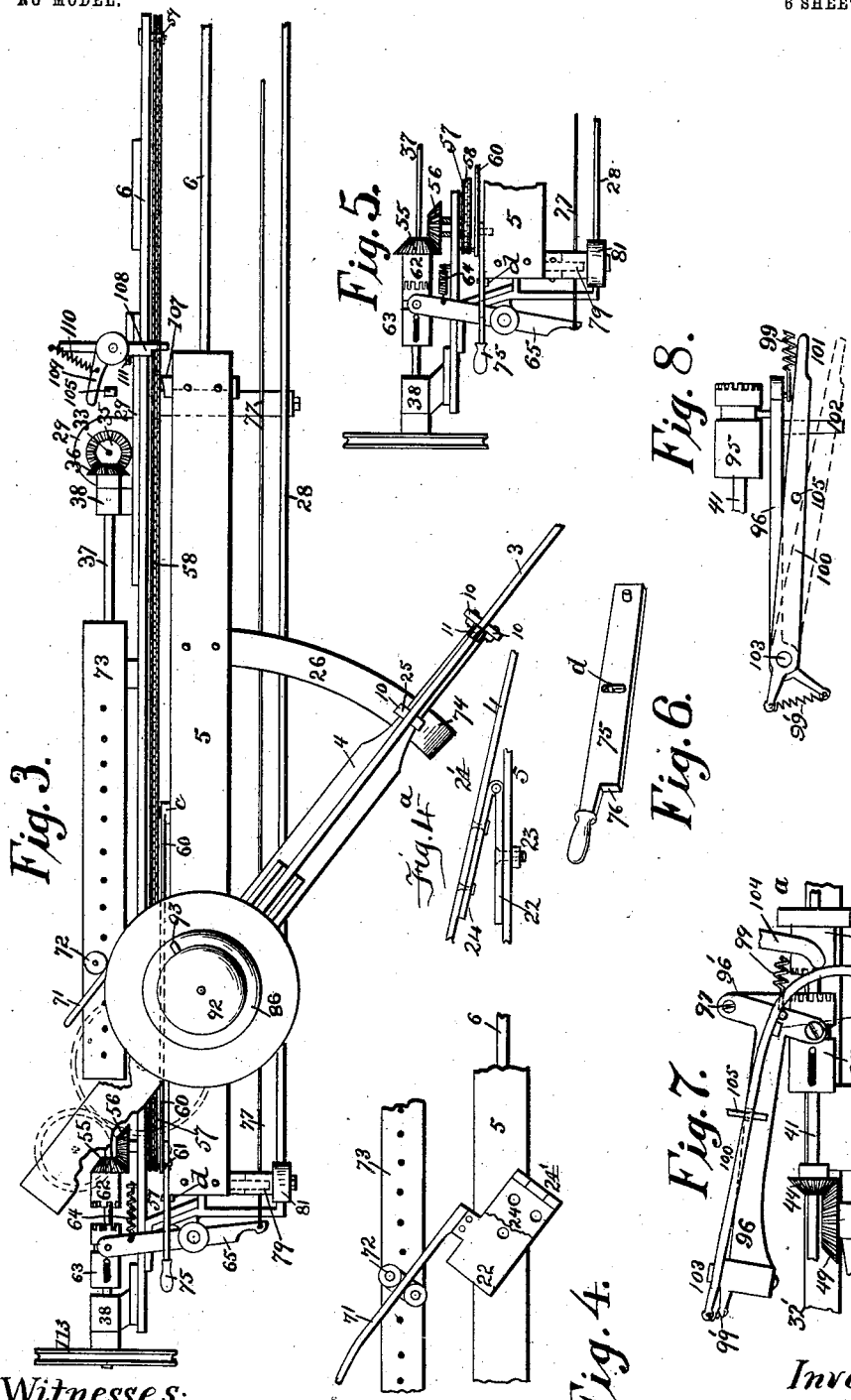
Witnesses:
H. S. Austin
John E. Burch
Inventor:
William Francis Altenbaugh
by Johnson & Johnson
Attorneys No. 744,274. PATENTED NOV. 17, 1903.
W. F. ALTENBAUGH.
MACHINE FOR AUTOMATICALLY GATHERING AND DELIVERING GLASS.
APPLICATION FILED MAR. 14, 1900.
NO MODEL. 6 SHEETS—SHEET 4.
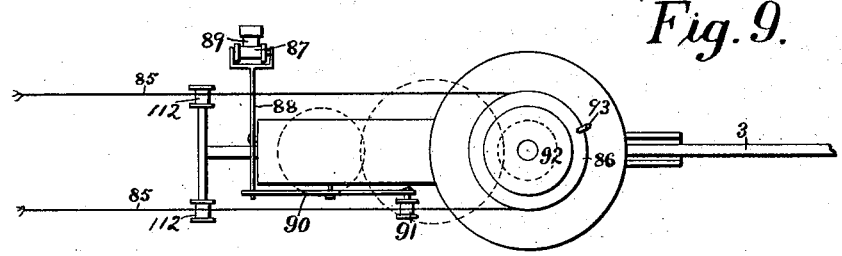
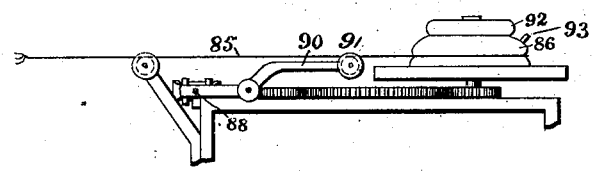
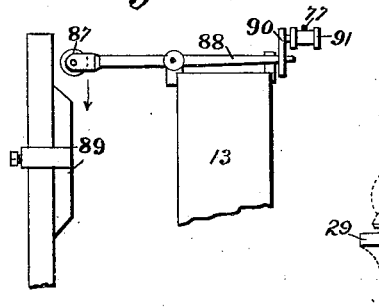
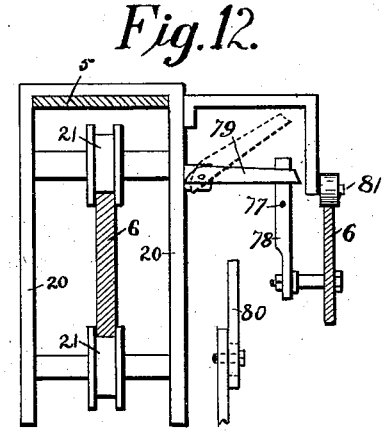
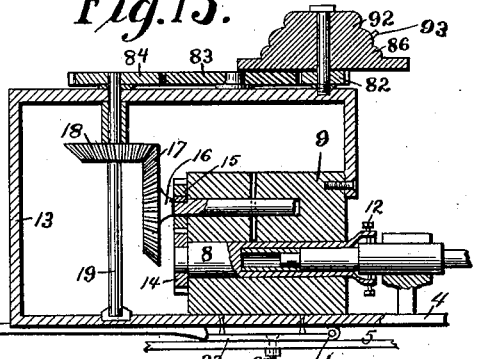

No. 744,274. PATENTED NOV. 17, 1903.
W. F. ALTENBAUGH.
MACHINE FOR AUTOMATICALLY GATHERING AND DELIVERING GLASS.
APPLICATION FILED MAR. 14, 1900.
NO MODEL. 6 SHEETS—SHEET 5.
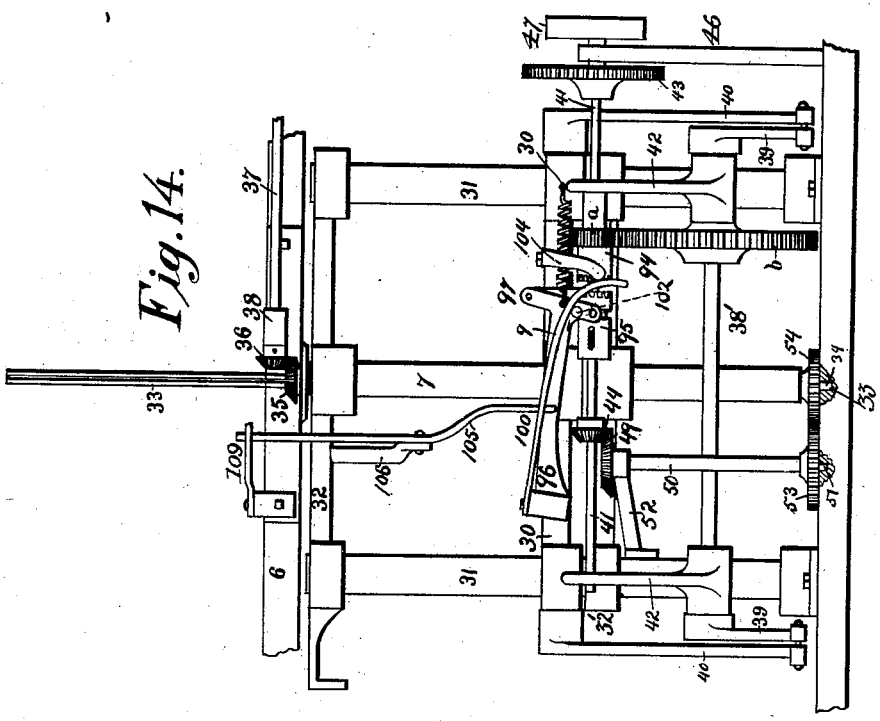
Witnesses.
H. S. Austin.
John E. Busch.
Inventor.
William Francis Altenbaugh
by Johnson & Johnson
Attorneys No. 744,274. PATENTED NOV. 17, 1903.
W. F. ALTENBAUGH.
MACHINE FOR AUTOMATICALLY GATHERING AND DELIVERING GLASS.
APPLICATION FILED MAR. 14, 1900.
NO MODEL. 6 SHEETS—SHEET 6.
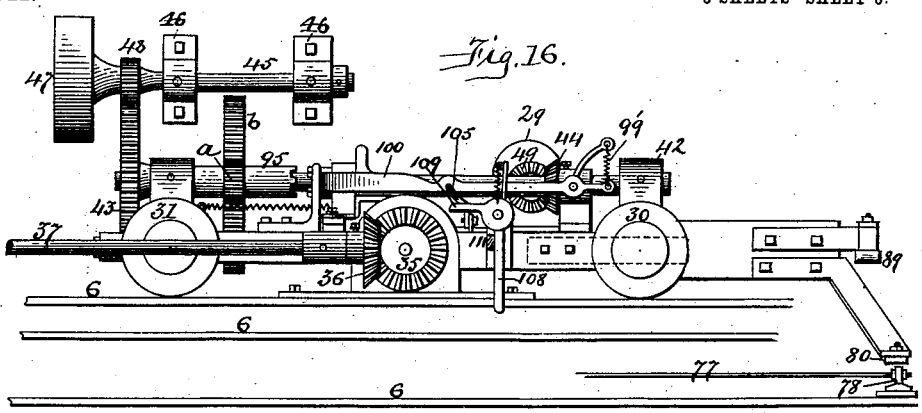
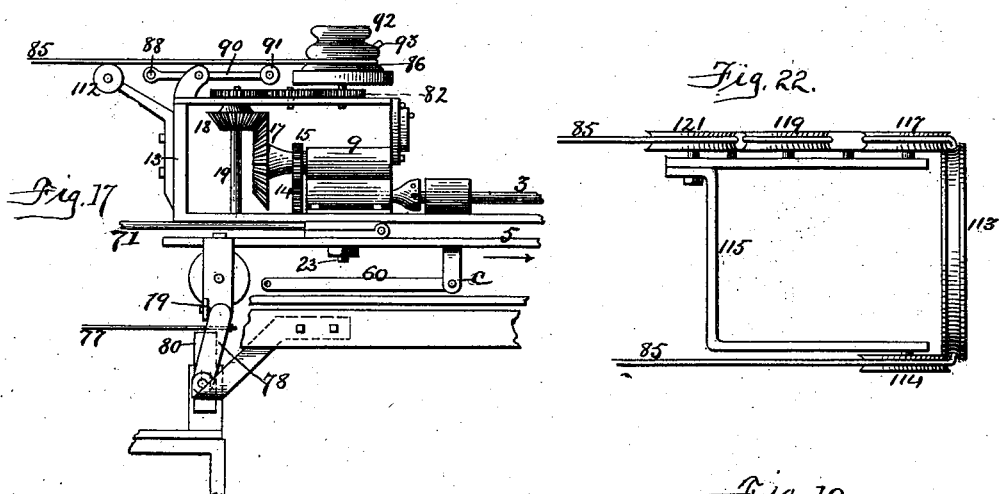
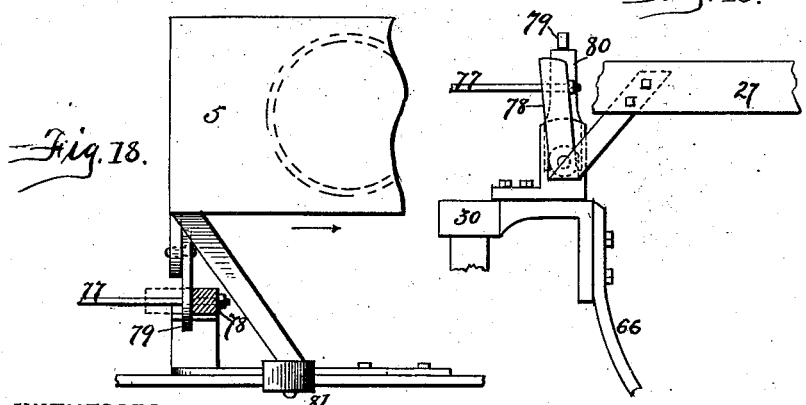
WITNESSES
H. S. Austin
John E. Burch
INVENTOR
William Francis Altenbaugh
by Johnson and Johnson
Attorneys No. 744,274. Patented November 17, 1903.

UNITED STATES PATENT OFFICE.

WILLIAM FRANCIS ALTENBAUGH, OF TIFFIN, OHIO, ASSIGNOR TO GEORGE BEATTY, OF WASHINGTON, PENNSYLVANIA.

MACHINE FOR AUTOMATICALLY GATHERING AND DELIVERING GLASS.

SPECIFICATION forming part of Letters Patent No. 744,274, dated November 17, 1903.

Application filed March 14, 1900. Serial No. 8,663. (No model.)

*To all whom it may concern:*

Be it known that I, WILLIAM FRANCIS ALTENBAUGH, a citizen of the United States, residing at Tiffin, in the county of Seneca and State of Ohio, have invented certain new and useful Improvements in Machines for Automatically Gathering and Delivering Glass, of which the following is a specification.

The following description read in connection with the drawings will enable any one skilled in the art to which my invention relates to understand its nature and to practice it in the form in which I prefer to employ it; but it will be understood that my invention is not limited to the precise form herein illustrated and described, as various modifications and equivalent changes may be made and adapted by the skilled constructor to carry out my invention.

Referring to the drawings, Figure 1 represents in side elevation a machine embodying my invention and in which the gathering instrument has been moved forward into the working chamber and its operating mechanism elevated to cause the instrument to be presented at its highest gathering pitch to the surface of the glass for gathering the proper quantity for a working charge. Fig. 2 represents a like view showing the operating mechanism of the gathering instrument as having been lowered to complete the gather and bring the instrument to a horizontal position to be moved out to deliver the charge. Fig. 3 is a top view of so much of the machine, showing the gathering instrument as having been moved back and swung out to deliver the charge, the carriage, and the means for reciprocating it. Fig. 4 shows a part of the carriage, the leaf-hinge pivoted thereto, and the guide-arm, which in its action as the carriage reciprocates causes the gathering instrument to be swung out at the side and again into alinement. Fig. 4ª is a side view of the hinge shown open to illustrate both the hinging and the pivoting of the carriage to allow the dipping of the gathering instrument at the end of its trackway 26 at the point of delivery, as in Fig. 3. Fig. 5 shows in top view the carriage-actuating clutch engaged as when the carriage is moving in or out. Fig. 6 is the hand-lever 75, seen in Fig. 3 as pivoted to the rear end of the carriage and having by its shoulder 76 automatically disengaged from the carriage-actuating clutch, and in Fig. 5 this hand-lever is seen as having been by hand lifted from its engagement with the clutch-lever 65 to allow the engagement of the clutch. Fig. 7 shows in side view the clutch device of the base structure on which the carriage-track frame is mounted and by which the elevation and lowering of the track-frame is automatically controlled, the arm 104, Fig. 14, depending from the track-frame being shown as having disengaged the clutch on the descent of said frame. Fig. 8 is a top view of the shifting parts of the same clutch device. Fig. 9 shows in top view the belt-cord-operated lever device for automatically changing the speed of the gathering instrument by changing the belt-cord 85 from the larger pulley 86 to the smaller pulley 92; and Fig. 10 is a side view of the same, the belt-cord being changed to the smallest pulley when the gathering instrument is rising and moving out with the charge to cause it to quickly take up and wind off the wire-glass which is drawn up with the charge, and thereby prevent it from being deposited on the bridge of the opening of the working chamber. Fig. 11 is a detail of the lever and wedge device shown in Fig. 9, by which the levers are actuated for shifting the belt-cord automatically as the track-frame descends to bring the lever device 88 in engagement with the wedge 89 for changing the speed of the gathering instrument. The relation of this wedge to the fixed base structure is seen in Figs. 1, 2, and 15. Fig. 12 shows in transverse section the track-frame 6, the carriage thereon, the clutch-connecting arm 78 on the track-rail, and the pivoted trip-arm 79 on the carriage, whereby when the latter having moved to the limit of its advance, with the gathering instrument at its highest pitch, as in Fig. 1, the arm 79, standing horizontally, strikes the vertical arm 78 and pushing it forward causes by its connecting-rod 77, Fig. 3, the said arm 78 to pull the clutch-lever 65, so as to disengage the clutch 63, and thereby stop the advance of the carriage while the gather is being made. The track-frame will then begin to descend, and reaching the limit of its descent will bring the trip-arm 79 in contact with the fixed stop 80 on the base-structure, and thereby lift said trip-arm and release the clutch-connecting rod 77, as shown by dotted lines in said figure, and allow the clutch 63 to be engaged by its spring 64 to move the carriage out as the latter and its supporting hinged track-section is brought into alinement with the main-track frame, as shown in Fig. 2. Fig. 13 is a vertical section of the chuck, showing the gearing by which the gathering instrument is rotated. Fig. 14 shows in elevation the base structure and the relation of its clutch device to the elevating and lowering frame which supports the track-frame, the view being taken from the rear side, the track-frame in its lowest position and the clutch disengaged to arrest the elevating movement while the carriage is moving back to swing out the instrument to deliver the charge, as in Fig. 3. Fig. 15 shows the driving-gear side of the machine, the track-supporting frame being partly elevated by the crank connections and with it the track and operating connections of the gathering instrument. Fig. 16 is a top view showing the gearing of the base structure, the track-frame line-shaft 37, and its connection with the base-center shaft 33, which is operated by the base-gearing to operate the line-shaft, and also the relation of the base-stop 80 to the track-frame. Fig. 17 is a side view showing a portion of the carriage, the pivoted arm 79 thereon, the track-frame, the pivoted arm 78 thereon and the relation of these pivoted arms to the fixed base-stop 80 on the base structure at the time the carriage has moved forward and brought its horizontal pivoted arm 79 against the vertical arm 78 of the track-frame and moved said arm to disengage the clutch 63 by the connecting-rod 77. In this view the track-frame is in the position on its descent and just before the pivoted carriage-arm 79 is caused to strike upon the fixed stop 80 and be thereby lifted to disengage it from the track-frame arm 78 to release the clutch-connecting lever 65 to allow the engagement of the clutch to effect the backward movement of the carriage with the gathered charge. Fig. 18 is a top view of the same, the pivoted arm 79 having engaged the vertical arm 78 and moved it back, disengaging the clutch by its connecting-rod 77. Fig. 19 shows a side view of the pivoted arm seen in Figs. 17 and 18 in its relation to the fixed stop 80 at the moment the track-frame is at the limit of its descent, the carriage-arm 79 disengaged by said stop 80 to allow the clutch 63 to be engaged, and the gathering instrument thereby to be withdrawn in a horizontal position, as in Fig. 2. In this view the movable fulcrum is shown at the limit of its function in controlling the gathering instrument and in which function it has caused the gathering instrument to effect an advance of about two inches and a half. Fig. 20, Sheet 1, shows in top view so much of the track-frame, the carriage, the gathering instrument, and the swinging guide-arm 71 as illustrates the function of a bracket-fender 123, Fig. 20, in the track-frame, with which the carriage-guide arm engages to prevent the carriage from being turned laterally on its pivot 23, Figs. 4 4ª, which it tends to do by the pulling of the sticky glass in being wound upon the iron; and Fig. 21 illustrates the movement of the gathering end of the instrument as controlled by the movable fulcrum, which controls such movement simultaneously with the elevation and lowering of the driven end of such instrument. Fig. 22 shows in top view the slack-take-up-pulley device of the belt-cord for rotating the gathering instrument.

My improved machine may be employed either in gathering glass for the manufacture of pressed glassware or of blown glassware. In the former case the glass having been gathered upon the gathering-tool or punty is moved into a convenient place, preferably in close proximity to the mold, where it can be cut off without removing the punty from the machine. In the other case the blowpipe on which the glass is gathered is preferably arranged so that it is readily removable from the machine and so that after its removal another blowpipe may be substituted for it. In the drawings I show the machine provided with a punty, which need not be removed in order to carry out the purposes of the machine. Where the machine is to be used for gathering glass on a blowpipe, I may use the mechanism described in my prior patent, No. 618,975, dated February 7, 1899.

In Figs. 1 and 2 is seen the working chamber of tank 1, in which the molten glass is maintained, preferably, at a uniform level, and the working opening 2 therein for the entrance of the gathering instrument. The relation of the machine to this opening is such that the gathering instrument may enter the molten glass at a high pitch and may leave the opening more nearly horizontally, and the opening will give a clear way for this purpose.

The gathering instrument 3 is mounted upon a pivoted swing-frame 4, hinged upon a carriage 5, which is movable upon the rail 6 of a track-frame to carry the gathering instrument into and from the working chamber. The track-frame is mounted upon an elevating and lowering frame 7 30, mounted in a suitable base structure.

The gathering instrument is set in a rotary holder or chuck-shaft 8, Fig. 13, revoluble in a bearing-block 9 on the swing-frame plate 4, and in order to support the gathering instrument and hold it in proper position I employ a holder consisting, preferably, of a pair of rolls 10, upon which the gathering instrument rests and against which a shoulder 11 thereon may bear. The receiving end of the chuck extends outside of its bearing-block and may be provided with screws 12 for holding the instrument.

A portion 13 of the swing-frame 4 carries suitable driving-gearing by which the chuck is rotated, which may comprise a pinion 14 on the outer end of the chuck-shaft engaging a like pinion 15 on a short shaft 16 above the chuck-shaft. This short shaft projecting from the bearing-block has a bevel-gear 17, which engages a bevel-pinion 18 on a vertical shaft 19, mounted in the end of the swing-frame 4 and driven in a way which I will presently state. This frame 4 is pivoted to the carriage 5, and in order that the carriage may be moved easily upon its track 6 I prefer to provide it with wheels 21, Figs. 1, 2, and 12, mounted on hangers 20 and adapted to run upon the upper and under sides of the rail 6. To pivot the swing-frame to the carriage and to make it capable of a double pivotal motion—namely, a horizontal swing—for the purpose of permitting the gathering instrument to move laterally to the delivering position after glass has been gathered thereon and also to dip at the end of its swing in order to bring the glass to the mold or marvering-block, I prefer to use a leaf-hinge 22, Figs. 4, 4ª, the pivot-bolt 23 passing through the lower leaf and being secured by a nut, while the upper leaf 24 is secured to the lower leaf by a pintle 24' and is fixed to the swing-frame. The swing-frame swings laterally on the axis of the pivot 23 and dips vertically on the axis of the pintle 24'. The frame 4 has a wheel 25, mounted upon a way 26, which projects laterally from the carriage and is provided with a depressed portion 74, which will cause the frame to dip when the wheel reaches it in the course of its side swing, as shown in Figs. 3, 4ª.

A convenient length for the track-frame is about twelve feet, and it may be formed of longitudinal rails or plates 6, suitably braced and adapted to carry the operating parts of the carriage and gathering instrument. It is formed with a portion 27 of its length arranged to dip or move vertically, and for this purpose said dipping portion is preferably hinged, as shown in Figs. 1 and 2. It is on this hinged part that the carriage is run and is caused to dip, so as to present the gathering instrument to the glass at a high gathering pitch or angle by means which I shall presently state.

The track-frame 28 is mounted upon the standard 7 by a bracket 29, Figs. 3, 15, 16, so that preferably a greater portion of its length stands forward thereof, and in order to raise and lower said standard I may employ any suitable lifting mechanism, preferably the following: A cross-head 30 is fixed to the standard and fitted at each end to a slide upon fixed standards 31 31, which are connected at their upper ends by a horizontal cross-head 32, through an opening in which and in a lower cross-head 32' the central standard 7 passes and is guided and braced. A shaft 33, whose function is to drive the endless chain or other driving-gear by which the carriage is reciprocated on the track-frame, is mounted in a step 34 and preferably passes through the standard, which is hollow for this purpose, and through a bevel-pinion 35, which is splined upon said shaft and seated on the bracket 29. This bevel-pinion 35 engages a bevel-pinion 36 on a horizontal shaft 37, mounted on bearings 38 on the track-frame, and it is the rotation of this vertical shaft 33 which causes the reciprocation of the carriage through the splined pinion 35, as I will now state. For lifting and lowering the track-frame a shaft 38' is mounted on fixed bearings and has cranks 39, connected to links 40, depending from the cross-head 30 of the lifting-frame, so that the rotation of said shaft 38' by its crank and link connections elevates and lowers the track-frame to the extent of the throw of the cranks.

For rotating the crank-shaft 38' a second shaft 41 is mounted in the upper ends of brackets 42, rising from the bearings of the crank-shaft 38' at the rear side of the standards, and has a gear-wheel 43 on its outer end and a pinion $a$, Figs. 14, 15, 16, which engages a gear $b$ on said crank-shaft. For rotating this second shaft 41 a short power-shaft 45, Figs. 15, 16, mounted in studs 46, has on its outer end a pulley 47, driven by a power-belt, while a pinion 48 on said shaft 45 engages the gear 43 on the shaft 41. On this shaft 41 is a bevel-pinion 44, which engages a bevel-pinion 49 on a vertical shaft 50, mounted in a step 51 and in a bracket 52 on one of the fixed standards. A gear 53 on the lower end of this vertical shaft 50 engages a pinion 54 on the lower end of the vertical shaft 33 of the hollow standard, so that from the power-shaft 45 the track-frame is elevated and lowered by the cranks and the carriage reciprocated by the central shaft.

The carriage-driving shaft 33 has a top bevel-pinion 35, which, by a bevel-pinion 55, Figs. 3 and 5, on the outer end of the line-shaft 37, drives a bevel-pinion 56 on a short transverse shaft, which is supported in a bracket on the rear rail and passing through the rail has a sprocket-wheel 57 on its inner end and from which a chain 58 extends to a sprocket-wheel 59, mounted in a bearing on the inner side of said rail. This chain is connected to the carriage base-plate preferably by a horizontal arm 60, Figs. 3 and 17, which is pivoted to said plate at $c$ and engages the chain at its other end by a pin 61, so that the rotation of the shaft 33 causes the rotation of the side clutch-connected shaft 37, which, driving the sprocket-wheel 57, causes the chain to travel and the carriage to be reciprocated.

The connection of the arm 60 with the carriage is in advance of the point 61, at which it is connected to the chain, so that when said point reaches the forward end of travel of the chain the arm will project forwardly. This is a convenient arrangement, because it causes the carriage to move beyond the end of the chain and does away with the necessity of extending the chain forward upon the pivoted or dipping section of the track-frame.

To control the driving of the chain, I may employ clutch mechanism, comprising a hub-clutch part 62, Figs. 3 and 16, on the side shaft 37, which is fixed to the bevel-pinion 55, and both are loose on said shaft, which can therefore rotate continuously, while the said hub-clutch part and its chain-connected gear are only actuated when the clutch is engaged. For this purpose the slidable clutch part 63 on said shaft is held normally engaged by a spring 64 to effect the rotation of the chain and the reciprocation of its connected carriage, while by means of a lever 65, pivoted to the frame, the slidable member of the clutch is shifted and held out of gear to stop the carriage at the limit of its rearward and of its forward movements in a way which I shall presently state. This clutch I call the "starting and stopping" clutch.

The dipping of the hinged track-rail section, with the carriage thereon, is accomplished by providing a supporting or guide fulcrum-bar 66, which supports the hinged section while the other section is being moved vertically, and thus causes the hinged section to incline or dip while the other section is rising and causes it to come into alinement when the other section descends. This bar 66 is secured to the fixed portion of the machine and curves downwardly with its concave side toward the working tank, and depending from the hinged track-frame section 27, near the hinge thereof, is a bracket 67, having pivoted thereto a supporting-arm 68, which has a roller 69 adapted to travel upon the fulcrum-bar. This supporting-arm 68 has means by which it can be adjusted so as to control the extent to which the hinged track-section can dip, and for this purpose I may employ a screw 70, arranged to engage the bracket and to vary the angle at which the arm 68 stands relatively to the hinged section. This adjustment enables me to adjust the angle or pitch of the gathering instrument at the time when it reaches the end of its downward motion and makes contact with the molten glass, and by varying this adjustment I may vary the extent of the immersion of the end of the instrument, and thus vary the amount of glass gathered thereon, or may adjust the dipping of the instrument to accommodate it to the level of the glass in the tank. Such adjustment is important, because the end of the gathering instrument should be immersed at a uniform depth in the surface of the glass to secure gathers of uniform weight.

The swing-frame 4 carries the chuck-shaft for the gathering instrument, the devices for rotating and speeding it, and the means by which said frame is swung out at the side of the machine to deliver the gather and swing back to its normal position for gathering a charge. For this purpose I prefer to employ a guide-arm 71, fixed to the under pivoted leaf 22 of the hinge, so that the hinge forms the turn-table and is also the hinge on which the swing-frame dips on the carriage when swinging out at the side to deliver the charge. For this purpose the guide-arm 71 extends rearward at the off side of the swing-frame and between a pair of guide-rolls 72, Fig. 4, set at the proper point on a plate 73, fixed to the off track-rail, and made adjustable to give the desired swing to the gathering-arm, said arm having a length sufficient to retain its engagement with the rolls during the swinging movement of the carriage. As the carriage moves back the arm sliding between the rolls will cause the pivoted frame to swing out at the side with the gathering instrument, while the forward movement of the carriage causes the pivoted frame to swing back into alinement with the carriage. The guide-arm stands in a position to enter between the guide-rolls at the proper point as the carriage moves back to swing the frame out and to leave the guide-rolls at the point at which it has swung said frame back into alinement with the carriage in its forward movement.

In Fig. 3 the gathering instrument is seen as having been swung out to the point where the charge is delivered into a glass-mold, (not shown,) and in this swing movement the wheel 25 on the swing-frame runs on the track 26, standing out from the carriage, and when it reaches the depressed seat 74 the swing-frame and the gathering-iron are caused to dip slightly to bring the glass into convenient proximity to the mold, (or to the marvering-block when said block is employed.) When the gathering-iron reaches the point of delivery, the carriage is stopped until the charge is removed, and for the purpose of conveniently stopping the carriage automatically I may employ the following clutch mechanism, by which the motion of the chain 58 is controlled. A lever 75 is pivoted to the carriage, its handle standing rearward, so that a shoulder 76, Figs. 1, 2, and 6, on the lever will strike the clutch-shifting lever 65 when the carriage reaches the end of its rearward travel and, moving it back, will disengage the clutch part 63, as in Fig. 3, wherein its lever-shoulder is engaged with the clutch-lever to hold the clutch open. To start the carriage forward, the hand-lever 75 is raised by the attendant to release its shoulder from the clutch-lever, when the latter by its spring 64 again engages the clutch, the carriage moves forward, and the swing-frame is caused to swing into line as the carriage carries the gathering-tool into the working chamber.

The hand-lever 75 is held in horizontal position by a pin $d$, Figs. 3 and 6, on the rail-frame passing through a vertical slot in the lever, so as to hold its shoulder 76 in position to strike the clutch-shifting lever 65 as the carriage moves back. The forward movement of the carriage is also limited by operation of the controlling-clutch, and this is done, preferably, by means seen in Figs. 3, 12, 17, 19, wherein a rod 77, preferably between the rails at the working side of the machine, connects with the clutch-lever 65 and with an arm 78, pivoted to and rising from the front track-rail, Fig. 12, so that the upper end of said arm stands in the path of an arm 79, pivoted to and standing out normally horizontal from the side of the carriage. As the carriage moves forward its arm 79, standing horizontally, will be caused to strike against the vertical arm 78 of the track-frame and, forcing said arm forward, will pull its connected rod 77, and with it the outer end of the clutch-lever 65, and, disengaging the clutch, stops and holds the carriage still while the gather is being made. This is the position of these parts seen in Figs. 3, 17, 16.

The backward movement of the carriage is effected upon the descent of the track-frame, preferably in the way which I will now state. A stop 80, preferably fixed at the front of the top cross-head of the base structure, standing up, comes in contact with the arm 79, pivoted to and projecting out from the carriage-frame, as the track-frame falls, and, lifting said arm, thereby releases it from the vertical arm 78, pivoted to the track-frame rail, as seen in Fig. 19 and by dotted lines in Fig. 12. This allows the clutch-spring 64 to pull the rod 77 and its connected arm 78 back and allow the engaging of the clutch, rotate the chain-connecting shaft 37 to pull back the carriage and to swing out the gathering instrument. This stop 80 is made adjustable to give the exact lift to the arm 79, and for this purpose the stop is fastened to a bracket.

As the outward sidewise swing movement of the gathering instrument and its swing-frame tends to lift the carriage in the direction of the swing, I prefer to provide it with a bearing-roll 81, Figs. 3, 12, and 17, to resist the tendency to tilt and to give steadiness to the movement of the carriage.

I have discovered that difficulties in gathering glass from a molten body in a melting pot or tank, which I explain below, can be overcome by accelerating the rotation of the gathering instrument as it leaves the surface of the molten glass. Mechanism of various forms may be employed for this purpose; but I prefer to use a belt-shifting device, which I shall now describe.

The chuck-shaft 8 is driven by cone-pulleys, Figs. 10 and 13, mounted by a stud fixed to the chuck-frame above the chuck bearing-block 9 and having a pinion 82 below the pulleys, which engages an intermediate gear 83, which in turn engages the pinion 84 on the vertical shaft 19, which has intermediate connection with the chuck-shaft. These cone-pulleys provide grooves for a driving belt-cord 85 and are for changing the speed of the gathering instrument. As this instrument is making the gathering it is rotated by the belt in the groove in the lower largest pulley 86; but, referring to Figs. 9, 10, and 11, as the carriage settles down the roll 87 of the pivoted arm 88, standing out from the top of the swing-frame, comes in contact with the incline block 89 on a bracket rising from the inner end of the base-frame and lifting the roll end causes the other end of the pivoted arm 88 to be depressed, and thereby depressing its connected end of the pivoted arm 90 raises its roll end 91 against the under side of the belt and shifts it to the groove of the upper pulley 92. This accelerates the speed of the gathering-iron and quickly winds off the thread of glass with which the gather terminates in the rising of the instrument, and thereby prevents long threads of glass from being drawn out by the gathering instrument, which would seriously interfere with the operation of the machine. The action of the lever-roll 91 to shift the belt-cord is supplemented by means of a pin 93, standing up from the pulley 96 just below the upper speeding-groove, so as to catch under the cord as it is being lifted and run it into the upper groove. To more particularly explain this shifting of the belt-cord, I may state that as the track-frame settles down with the carriage the roll end of the lever 88 is brought upon the wedge-block 89, which causes the roll end of the lever 90 to rise and lift the belt, so that the pin 93, rotating with the pulley, will catch under the belt, and thereby render certain its shifting upon the upper small pulley to double the speed of the gathering instrument. This increased speed is effected while the gathering end is rising from the molten glass with the gather and is completed as the roll 87 passes down off the incline block, which allows the roll end of the lever 90 to fall, and the pulley then having assumed a horizontal position and the instrument then raised from the glass the belt will be again caught by the pin and run down into the groove of the largest pulley, and thereby reduce the speed while the instrument is being moved into position to deliver the glass, and thus to prevent it from being thrown off the instrument, which might happen under a high speed.

The block 89 for actuating the pivoted arm 88 is wedge-shaped at its upper and lower ends to give it the function of a cam to operate the levers 88 and 96, and the flat surface between the inclines is long enough to hold the belt-cord in the upper groove 92 a sufficient time for keeping the speed on to wind off the wire-glass, and this wedge-block is made adjustable on its supporting-bar to suit the movement of the track-frame. Usually a short period of this increased speed will suffice to wind off the wire-glass and the time of such increased speed may be controlled by the length given the flat surface of the cam-block 89.

The speed of the rotation of the gathering instrument in moving toward and from the working chamber is the same in its gathering and in its delivering functions and is determined by the speed of the largest pulley, which is driven by the train of gear of which the gear 18 is caused to make, say, three revolutions to one of the gear 17, which connects with the gear-train of the pulleys.

Referring to Fig. 2, it is when the hinged track-section assumes its horizontal position that the pivoted arm 79, descending with the carriage, comes in contact with and is lifted by the stop 80, and the clutch 63 is thereby released to again start the carriage back, as in Fig. 19. Simultaneously with the tripping action of the arm 79 the cranks will be at their lowest point, and the rotation of the shaft 41 should be stopped to prevent the lifting action of the cranks while the carriage moves back. This may be effected by a clutch on the shaft 41. The part 94 of said clutch is toothed and is loose on the shaft, while the sliding clutch part 95 is also toothed and is splined on said shaft and is operated by a shifting-lever 96, which is pivoted at 97 to a bracket 96' on the fixed lower cross-head 32' and engages the clutch-groove by the pin-lug, Figs. 7, 8, and 14. This clutch I call the "elevating-clutch." A spring 99 connects the shifting-lever 96 to pull the splined clutch 95 into engagement with the loose section, while a tripping-arm 100, pivoted to the forward end of the shifting-lever, extends forward and terminates in a downward curved or inclined end 101 at the clutch. The clutch-shifting lever has a vertical swing movement on its pivot 97, while the arm 100, having the curved end 101, rests on a lug 102, projecting from the clutch-lever, as in Figs. 7 and 8, and has a sidewise swing upon its pivot 103 and has two functions, one of which is a pushing function to push and swing back the hanging end of the clutch-lever and disengage the clutch, as in Figs. 7 and 14. This pushing back of the clutch is effected by an arm 104, depending from the lifting cross-head in vertical line over the curved end 101 of the tripping-arm, so that on the descent of the lifting cross-head 30, this arm 104 engages and presses upon the end 101 of the arm 100, and pushing it back pushes thereby the lower end of the hanging-lever 96, which by its pin-and-groove connection, Fig. 8, with the sliding clutch 95 disengages the clutch and stops the rotation of the shaft 41 and of the crank-operating gear. The other function of this curved arm 100 is for disengaging it from the depending arm 104, by which the clutch 95 is held disengaged to allow the clutch to be reëngaged by the pulling action of its spring. This tripping function of the curved arm is effected by a lever 105, Figs. 2, 7, 8, and 14, which is pivoted to a bracket 106, depending from the fixed cross-head of the base structure, the said lever extending above said cross-head, so as to stand at the off side of the track-frame, as in Figs. 3, 14, and 16, while the lower end of said lever engages the curved arm 100 about mediately of its length, so that when the upper end of this lever is forced toward the track-frame its lower end will force the curved arm away from the clutch, and thus shove it sidewise off the end of the depending arm 104, as shown by dotted lines in Fig. 8, to allow the clutch to be engaged. For this purpose the end of the arm 104 need only act on the narrow end 101, so that the side-tripping movement of the arm 100 need only be slight.

The tripping action of the lever 105 is effected by the following means: The charge having been delivered from the gathering instrument, the attendant raises the hand-lever 65 to release the clutch part 63 and allow its engagement. The chain is thereby set in motion to move the carriage forward. Having moved, say, about three inches, a projection 107 from the off edge of the carriage, Fig. 3, near its front end comes against the inner end 108 of a bell-crank lever pivoted to a bracket on the off rail 6 and forcing said inner end back toward the front causes its other arm 109, Figs. 3 and 16, to move inward against the upper end of the trip-lever 105, which is thereby forced inward to cause its lower end to push the narrow end 101 of the arm 100 sidewise off the depending arm 104, the position of the arm 100 when so pushed being indicated by the dotted lines in Fig. 8. A spring 110 connects the bell-crank lever so as to return it to its normal position after it had been tripped by lug 107. On the return of the carriage the projection 107 strikes and passes by the bell-crank. A spring 99', Figs. 7 and 8, likewise pulls the arm 100 and lever-arm 105 back to their normal positions. A stop 111 holds this bell-crank lever in its normal position against the action of the spring 110.

I have stated that the gathering instrument is rotated continuously to pick up a quota of glass and to hold it thereon while it is being moved out of and away from the working tank to the place of delivery, and, referring to Figs. 1 and 2, it will be seen that the pulleys by which rotation is effected must by the dipping of the gathering instrument change their position with respect to the driving connections, which are fixed at the rear end of the track-frame. As the hinged section of the track-frame dips, the carriage thereon dips also, and the frame 13 of the pulleys is swung forward and downward to the extent of the inclination of such dipping. This forward swing of the pulleys pulls the belt-cord forward on its supporting-roll 112, while the upward swing of the hinged track-section to a horizontal plane will relax the belt-cord. To provide for this and maintain the tautness of the belt-cord in the changing positions of its pulleys, I arrange a suitable slack-adjuster, which may consist of a system of pulleys on the rear end of the track-frame, as in Figs. 1 and 18, so as to provide a weighted slack in the belt-cord to keep it always under proper tension. Referring to these figures, the line-shaft 37 has a pulley 113 on its rear end, and the belt 65 from one side of the speeding-pulleys passes thence over a pulley 114 at the top of a frame 115, thence down under said shaft-pulley 113, up over a pulley 117 on the other side of the frame, thence down under a pulley 118 below the frame, thence over a top pulley 119, thence down under a bottom pulley 120, thence over a top pulley 121 to the other side of the speeding-pulleys. The two bottom pulleys are connected by a weighted tie 122 and are free to rise and fall with the pull and slack of the belt, and thus keep it taut. The fixed and the lifting cross-heads are made adjustable by bolts engaging the fixed and the hollow standards, so as to give exact movements to the lifting-crank connections.

The operation of the machine constructed as above described is as follows: When the carriage 5 is at the end of its rearward travel, its controlling-clutch is disengaged and the gathering instrument stands out at the side of the machine at the place at which it is desired to deliver the charge, Fig. 3. Starting from this point, the operator causes the carriage to travel forward by raising the hand-lever 75, thus operating the clutch 63 and causing the chain 58 to move and to advance the carriage. The lifting devices are then set into operation as above explained, and the track-frame is caused to rise slowly, lifting with it the carriage and gathering instrument, and either before or simultaneously with the lifting of the track-frame the swing-frame by operation of the guide-arm 71 is swung back into line with the working chamber of the melting-furnace. The advance of the carriage introduces the gathering instrument into the furnace, and the carriage preferably reaches the end of its travel and is stopped by automatic disengagement of the clutch 63 before the track-frame has been completely raised. As the track-section 28 rises its forward hinged section 27, being supported upon the fulcrum-bar or supporting-guide 66, will incline or tip to an extent and with a speed depending upon the curvature of the bar 66 and upon the adjustment of the screw 70, and as the track-frame nears the end of its ascent it will cause the rotating gathering-tool to incline and dip into the molten glass at a high pitch. The track-frame then begins to descend, and by the action of the supporting-guide 66, explained below, the hinged section of the track-frame is brought toward a horizontal position, thus simultaneously raising the end of the instrument and giving it a forward motion in the glass, which materially enhances the operation of gathering. When the gathering instrument leaves the glass, its speed of rotation is accelerated, as above explained, for a period of time sufficient to permit the winding off of the threads of glass which hang from the gather. As the track-frame descends and brings the hinged section toward a horizontal position the carriage is caused to move back by operation of the starting-clutch, as above explained, thus withdrawing the gathering instrument from the furnace. When the track-frame reaches its lowest position, it is stopped by disengagement of its controlling-clutch, and when the carriage is retracted sufficiently the guide-arm engages the rollers 72, and the swing-frame is thereby swung on its pivot 22 so as to bring the gather of glass to the place of delivery either at the mold or marvering-block. As it reaches the end of its motion the swing-frame and gathering instrument dip, and the carriage being then at the end of its backward travel stops and the swing movement of the gathering instrument ceases. This completes the cycle of operation, which is repeated as often as desired. The gathering instrument may be rotated continuously by the pulleys 86 or 92 during the movements of the machine, though it is only necessary to rotate it while it carries the gathering of glass.

Referring to Figs. 1, 2, 21, I will now more particularly describe the path of the gathering instrument as it is controlled and guided by the supporting guide or fulcrum-bar 66. The fulcrum-bar is curved, and in the position seen in Fig. 1 the wheel 69 is at the highest part of the curve when the gathering instrument is at its highest pitch, with its gathering end on the surface of the glass. Then the lifting mechanism having reached its highest point begins to descend. The fulcrum of the hinged track part will roll down on the fulcrum-bar, and this will cause the gathering-point to move forward in the glass, while at the same time the driven end of the iron and the rolling fulcrum settle down, causing the gathering-point to gradually rise, describing an advancing curve struck from the hinge of the track-frame. According to the pitch of the gathering-iron will be the extent of its advance gathering movement on the surface of the glass—say from two to two and one-half inches, more or less. In this gathering action the driven end of the iron will descend twice as fast as the gathering end rises. Illustrating this in Fig. 21, let 124 be the highest point of the pitch of the gathering-iron, 125 the movable fulcrum-point, and 126 the lowest or gathering point. Then the lowering of the iron from its highest point will in proportion cause it to lower at its movable fulcrum, and thereby cause the gathering end to advance from 126 to 127, slowly rising in describing the arc 128. In describing this arc the gather is made and the wire-glass wound off, the rise of the gathering end being preferably about six inches and the descent of the driven end 124 about twelve inches. This would bring the gathering instrument and its carriage on a level with the rack-frame, as in Fig. 2, with the rolling fulcrum at the lowest end of the concave fulcrum-bar. In this gathering action the rolling fulcrum and the track-lifting mechanism start from their highest point and settle down in unison, so that the lifting mechanism controls the descent of the track-frame simultaneously with the action of the rolling fulcrum in giving the gathering action to the iron and in bringing it to a level. In this gathering action the iron rotates and is thereby subjected to a pulling action in winding the sticky glass upon it as it rises, and this tends to pull the iron to one side, and therefore would, unless prevented, turn the swing-plate in the same direction. To prevent this, I provide the rear rail with a bracket-fender 123, Fig. 20, against which the guide-arm 71 is caused to bear, and thereby resist the turning of the swing-plate from this cause.

I claim—

1. In a machine for gathering and delivering glass, and in combination with a track-frame, a carriage, and means for reciprocating it, a gathering instrument on the carriage, and means for rotating it, of means for elevating the driven end of the gathering instrument, and means whereby its gathering end is simultaneously lowered to give it the proper gathering pitch.

2. In a machine for gathering and delivering glass, and in combination with a track-frame, a carriage thereon and means for reciprocating it, a gathering instrument and means for rotating it, of means for elevating its driven end, and means whereby its gathering end is supported during such elevation and while the instrument is moving at the proper gathering pitch.

3. In a machine for gathering and delivering glass, a base structure, a frame mounted thereon, a gathering instrument mounted on said frame, and means for raising and lowering said frame, in combination with means whereby the gathering instrument is caused to assume the proper gathering pitch as the said frame is being elevated.

4. In a machine for gathering and delivering glass, and in combination with a track-frame, a carriage thereon, and means for reciprocating it, a gathering instrument on said carriage, and means for rotating it, of means for raising said carriage, and means for lowering the gathering end of said instrument to give it the proper pitch and supporting it in such position.

5. In a machine for gathering glass, a gathering instrument, means for rotating it, means for reciprocating it, and means for raising and lowering its driven end, a fixed concave fulcrum part standing downward toward the gathering end of the instrument and means coacting therewith whereby said gathering end is supported and its path controlled.

6. In a machine for gathering glass, a gathering instrument, means for rotating it, means for reciprocating it, and means for raising and lowering its driven end, a fixed concave fulcrum part standing downward toward the gathering end of the iron, means coacting therewith whereby said gathering end is supported and its path controlled, and means for adjusting said support in its relation to said concave fulcrum part.

7. In a machine for gathering glass, a gathering instrument, means for rotating it, means for reciprocating it, a hinged support therefor, a fixed concave fulcrum-bar, and a part depending from said hinged support arranged to travel upon the concave, and means for raising and lowering said hinged support.

8. In a machine for gathering and delivering glass and in combination with a track-frame, having a hinged section, a carriage, and means for reciprocating it, a gathering instrument and means for rotating it, means for elevating and lowering the driven end of said instrument, and means whereby its gathering end is supported and caused to advance with a gathering function upon the surface of the glass and to rise therefrom during the lowering of its driven end.

9. In a machine for gathering and delivering glass, a base structure, a depending concave bar fixed thereon, a track-frame having a hinged end section, means mounted in the base structure for supporting the track-frame, means mounted in the base structure for raising and lowering the track-frame, a supporting-fulcrum depending from the hinged track-section arranged to travel upon the fixed concave bar, a carriage upon the track-frame, means for reciprocating the carriage, a gathering instrument upon the carriage, means for rotating it, and means whereby the lowering of the gathering end of the instrument is effected simultaneously with the elevation of the track-frame.

10. In a machine for gathering and delivering glass, a base structure, a depending concave bar fixed thereon, a track-frame having a hinged end section, means mounted in the base structure for supporting the track-frame, means mounted in the base structure for raising and lowering the track-frame, a supporting-fulcrum depending from the hinged track-section arranged to travel upon the fixed concave bar, a carriage upon the track-frame, means for reciprocating the carriage, a gathering instrument upon the carriage, means for rotating it, and means whereby the raising of the gathering end of the instrument is effected simultaneously with the lowering of the track-frame.

11. In a machine for gathering and delivering glass, a track-frame having a hinged end part, a fulcrum device depending from said hinged part, a fixed concave bar for supporting the said hinged part fulcrum device, and means for raising and lowering the track-frame, a carriage thereon, means for reciprocating it, a gathering instrument, means for rotating it, whereby the means for reciprocating the carriage constitutes the means whereby it is held upon the inclined hinged track part during the gathering operation when the instrument is at the highest pitch.

12. In a machine for gathering and delivering glass, and in combination with a carriage and a gathering instrument mounted thereon, of a track-frame having a hinged end section, a base structure, means mounted therein whereby said track-frame is supported, elevated, and lowered, and coöperating, mechanism on the base structure and on the hinged track-section, whereby the elevating and lowering movements of said track-frame are caused to effect the dipping and raising of its hinged end section for the purpose stated.

13. In a machine for gathering and delivering glass, and in combination with a track-frame having a hinged end section, a carriage, a gathering instrument mounted thereon, mechanism for reciprocating the carriage, a support for said track-frame, and mechanism for automatically elevating and lowering the track-frame support, mechanism whereby the hinged end section is caused to dip simultaneously with the elevation of said track-frame, mechanism whereby said hinged section is caused to assume a horizontal position simultaneously with the lowering of the track-frame, and mechanism whereby the carriage is retained on the hinged section in presenting the gathering instrument at a high pitch in its gathering function.

14. In a machine for gathering and delivering glass, and in combination with a track-frame having a hinged end section, a carriage, a gathering instrument mounted thereon, a support for said track-frame, and mechanism whereby to automatically elevate and lower the track-frame support, mechanism whereby the hinged end section is caused to dip simultaneously with the elevation of the track-frame, mechanism whereby said hinged section is caused to assume a horizontal position simultaneously with the lowering of the track-frame, an endless chain mounted on the track-frame, and a rod pivotally connecting the chain and the carriage for holding the latter in a dipping position on the hinged frame-section while the gather is being made, means for rotating the chain, and means for rotating the gathering instrument.

15. In a machine for gathering and delivering glass, and in combination with a track-frame having a hinged end section, a carriage and a gathering instrument mounted thereon, of a support for the track-frame, mechanism for elevating and lowering said frame-support, a base structure within which said track-frame support and said mechanism are mounted, a fixed concave fulcrum on the base structure, and a rolling bearing depending from the hinged frame-section in contact with said concave fulcrum whereby to present the gathering instrument at a high gathering pitch, means whereby the carriage is held in such position, means for reciprocating it, and means for rotating the gathering instrument.

16. In a machine for gathering and delivering glass, and in combination with a carriage and a gathering instrument mounted thereon, of a track-frame having a hinged end section, a support for said track-frame, and mechanism for automatically elevating and lowering the track-frame support, a base structure for containing said support and said mechanism, a fixed concave fulcrum-bar on the base structure, and a rolling support depending from the hinged end section in constant bearing contact with said concave fulcrum, whereby to support said hinged end section in all positions, means for holding the carriage on the hinged section at its highest pitch, means for reciprocating the carriage and means for rotating the gathering instrument.

17. In a machine for gathering and delivering glass, and in combination with a track-frame having a hinged end section, a carriage and a gathering instrument mounted thereon, of means whereby the hinged frame-section is automatically caused to dip, means constantly maintaining a support for said hinged section, and means for raising and lowering said track-frame whereby to cause said hinged section to dip and to assume alinement with the track-frame, means for reciprocating the carriage, and means for rotating the gathering instrument.

18. In a machine for gathering and delivering glass, and in combination with a carriage, means for reciprocating it, a gathering instrument mounted upon said carriage, and means for rotating it, of means for automatically accelerating the speed of such rotation as the gathering instrument is being elevated with the gather, whereby to quickly wind off the wire-glass drawn up by the instrument.

19. In a machine for gathering and delivering glass, and in combination with a track-frame, means for raising and lowering it, a carriage thereon, and means for reciprocating it, a gathering instrument on said carriage, and means for rotating it, of means automatically to accelerate the speed of its rotation as the gathering instrument is being elevated with the gather whereby to quickly wind off the wire-glass.

20. In a machine for gathering and delivering glass, and in combination with a carriage, means for reciprocating it, a gathering instrument and means for rotating it, of means for automatically accelerating the speed of such rotation as the gathering instrument is being elevated with the gather to wind and break off the wire-glass, consisting of cone-pulleys, a belt-cord, a lever device for shifting the cord on the pulleys, and a fixed incline arranged to engage said lever device, means whereby the carriage is raised and lowered, respectively, and to cause the engagement of the lever device and the incline whereby to effect the changing of the belt-cord from a large to a smaller cone-pulley, as the instrument is lifting and withdrawing the gather.

21. In a machine for gathering and delivering glass, and in combination with a carriage and means for reciprocating it, a gathering instrument and means for rotating it, of means for automatically accelerating the speed of such rotation as the gathering instrument is being raised with the gather which consists of the cone-pulleys, their driving-belt cord, the jointed levers 88, 90, one of which is arranged to engage one side of the belt-cord, a fixed incline 89 arranged to engage the other connected lever, and a shifting pin 93 at the base of the smaller cone, and means whereby the carriage is raised and lowered for operation in the way described.

22. In a machine for gathering and delivering glass, and in combination with a track-frame having a hinged end section, a carriage and means for reciprocating it, a gathering instrument, and means for rotating it, means for raising and lowering the track-frame, means whereby its hinged section is caused to dip as the track-frame is being elevated, means whereby said hinged section is caused to assume a horizontal position as the track-frame is being lowered, and means whereby the speed of the gathering instrument is caused to be accelerated while the hinged track-section is assuming a horizontal position for the purpose stated.

23. In a machine for gathering and delivering glass, and in combination with a track-frame having a hinged end section provided with a depending roll-supporting device, a carriage mounted upon said frame, a gathering instrument upon the carriage, means for reciprocating the carriage, and means for rotating the gathering instrument, a base structure, means mounted therein for supporting the track-frame, means operatively arranged in the base structure whereby the track-frame is elevated and lowered and a fulcrum concave bar on the base structure arranged to maintain a constant bearing for the rolling support whereby the hinged track-section is caused to present the carriage and the gathering instrument at a high pitch in entering and gathering the glass.

24. In a machine for gathering and delivering glass, and in combination with a track-frame having a hinged end section, a carriage mounted upon said frame, a gathering instrument upon said carriage, means for reciprocating the carriage, and means for rotating the gathering instrument, of a base structure, a standard fixed to said track-frame, and slidably mounted in the base structure, means operatively arranged in said structure for elevating and lowering the track-frame, and means for conjoint operation carried by the base structure, and the hinged frame-section, whereby the latter with the carriage thereon is controlled to present the gathering instrument at a high pitch for gathering the glass.

25. In a machine for gathering and delivering glass, and in combination with a track-frame having a hinged end section, a bearing-roll depending from said hinged section, a carriage and a gathering instrument mounted thereon, means for reciprocating said carriage, and means for rotating said gathering instrument, a standard on which said track-frame is mounted, a base structure within and upon which said standard is supported and guided, and a concave fulcrum-bar forming a bearing and support for said depending roll, a power-driven crank-shaft mounted in the base structure, and means connecting the cranks and the standard, whereby the elevation and depression of the track-frame is caused to control the pitch of the hinged frame-section and the carriage thereon, and thereby give the gathering instrument the proper positions for gathering and delivering.

26. In a machine for gathering and for delivering glass, and in combination with a track-frame having a hinged end section, a roll depending from said hinged section, a carriage and a gathering instrument mounted thereon, means for reciprocating the carriage, and means for rotating said instrument, a hollow standard on which the track-frame is mounted, a base structure within and upon which said standard is supported and guided, and a fulcrum-bar depending from said structure, forming a bearing and support for said depending roll, a shaft passing through the hollow standard, a power-driven crank-shaft, mounted in the base structure, means connecting the cranks and the hollow standard, means connecting the crank-shaft and the lower end of the shaft passing through the hollow standard, means connecting the upper end of the center shaft with the means for reciprocating the carriage, and means for controlling such reciprocation in unison with the elevating and lowering movements of the track-frame.

27. In a machine for gathering and delivering glass, and in combination with a base structure, a track-frame mounted thereon, means operative in the base structure whereby the track-frame is elevated and lowered, a hinged end section on the track-frame, means depending therefrom, coöperating with means on the base structure for causing said hinged section to assume a high pitch and for causing it to assume a horizontal position, a carriage and a gathering instrument thereon, a clutch, and the track-frame, means for reciprocating the carriage and for rotating the instrument, and means fixed on the base structure coöperating with means on the track-frame, and on the carriage, whereby to cause the engagement of the clutch to cause the outward movement of the carriage at the limit of the descent of the track-frame to deliver the charge, and means for disengaging the elevating mechanism of the track-frame while the charge is being delivered.

28. In a machine for gathering and delivering glass and in combination with a base structure, a crank-shaft mounted therein, cranks mounted thereon, a power-driven shaft 41 having an elevating-clutch 91, and cog-gearing connecting the two shafts, of a standard-frame supported and guided within said base structure, arms pivoted to said frame and connecting the cranks, a track-frame 40 fixed on said standard-frame, having a hinged end section, a carriage mounted upon said track-frame, a gathering instrument mounted upon the carriage, means for reciprocating the carriage, means for rotating said gathering instrument, means whereby its hinged section is caused to dip as the track-frame is raised and to assume a horizontal position as the track-frame is lowered, a depending arm 104 on the standard-frame arranged to disengage the elevating-clutch at the limit of the descent of said frame, and means for effecting such disengagement, consisting of the clutch part 95, and its connected lever 100 on the base structure, the lever device 108 on the track-frame, the lever 105 on said frame and the projection 107 on the carriage for engaging the lever device 108 whereby the engagement of the clutch is effected.

29. In a machine for gathering and delivering glass, and in combination with a track-frame having a hinged end section, a base structure and means slidable therein for supporting said track-frame, a gathering instrument, a carriage therefor, and means for reciprocating said carriage, means for rotating the gathering instrument, and means whereby it is caused to dip at a high pitch by the dipping of said hinged frame-section, means whereby the carriage is held on the dipping hinged section, means whereby said hinged frame-section is supported while being dipped and while being raised, means for raising and lowering the track-frame, and a clutch for disengaging the means for operating the carriage while the hinged track-section is being raised and lowered.

30. In a machine for gathering and delivering glass, and in combination with a track-frame, a carriage thereon, a hinged end section on said frame, and a roll-bearing device for supporting it, means for reciprocating the carriage, a swing-frame mounted on the carriage, a gathering instrument mounted on the swing-frame, and means whereby the latter is caused to be swung outward and inward at the side, a hinge fixed on the swing-frame, and pivoted to the carriage, whereby the latter is caused to dip on its hinge in advance of its pivotal connection, and a sideway or ledge on which the said hinged plate swings, whereby the latter is caused to have a firm seating on the carriage in gathering and in its swing movements and to dip on the carriage in delivering the charge, and means for rotating said instrument.

31. In a machine for gathering and delivering glass, and in combination with a track-frame, a carriage, a gathering instrument mounted thereon, and means for rotating it, of means for reciprocating and for stopping the carriage, consisting of the endless chain, the side shaft 37, means for rotating it, a rod 60 connecting the chain and the carriage, the bevel-gear 55 and 56 connecting the shaft and the chain, a spring-controlled clutch on said shaft, a clutch-lever 65, the pivoted arm 78 and the rod 77 connecting the clutch-lever and said arm, these several parts mounted on the track-frame and the trip-arm 79 mounted on the carriage and adapted to engage the arm 78, whereby at the end of the forward movement of the carriage the clutch is disengaged on the advancing contact of the arm 79 with the arm 78 to stop the carriage.

32. In a machine for gathering and delivering glass, and in combination with a frame, a carriage, a gathering instrument mounted thereon, and means for rotating it, of means for reciprocating and stopping the outward movement of the carriage consisting of the endless chain, the side shaft 37, means for rotating it, a rod 60 connecting the chain and the carriage, the bevel-gear 55 and 56 connecting the side shaft and chain, a spring-controlled clutch on said shaft—a clutch-lever 65, and the hand-lever 75 mounted on the carriage and engaging said clutch-lever at the limit of the outward movement of said carriage to disengage said clutch to stop the carriage.

33. In a machine for gathering and delivering glass, and in combination with a frame, a carriage, a gathering instrument mounted thereon, and means for rotating it, of means whereby the carriage is reciprocated and stopped at the limit of its forward and outward movements, consisting of the endless chain, the side shaft 37, means for rotating it, a rod 60 connecting the chain and carriage, the bevel-gear 55 and 56 connecting the shaft and chain, a spring-controlled clutch on said shaft, a clutch-lever 65, the pivoted arm 78 and the rod 77 connecting the clutch-lever and said arm, these several parts mounted on the frame, the trip-arm 79 mounted on the carriage adapted to engage the arm 78, the hand-lever 65 mounted on the carriage adapted to engage the clutch-lever, means for elevating and lowering the carriage, and a fixed stop 80 for tripping the arm 79 during and by the descent of the carriage for the purpose stated.

34. In a machine for gathering and delivering glass, a base structure, a shaft mounted therein and having a crank on each end, and gear connecting said crank-shaft with the driving power, in combination with a standard-frame supported and guided within said base structure having arms connecting the cranks, a track-frame upon said standard-frame, having a hinged section, a carriage mounted upon said track-frame, a gathering instrument mounted upon said carriage, means whereby the hinged frame-section is caused to dip, as the track-frame is raised, and to assume a horizontal position as the track-frame is lowered, a clutch for controlling the crank-shaft, means whereby the clutch is thrown out of gear at the limit of the descent of the track-frame, and means for reciprocating the carriage, and means for rotating the gathering instrument.

35. In a machine for gathering and delivering glass, and in combination with a track-frame having a hinged section, and an arm having a roll depending therefrom, a carriage and a gathering instrument mounted thereon, a hollow standard on which said track-frame is mounted, a base structure upon which said standard is supported, a shaft passing through said hollow standard, having a pinion on its lower end and supported in the base structure, a crank-shaft, and means connecting its cranks and the hollow standard, a shaft having a clutch, gear connecting the crank and the crank clutch-shafts, gear connecting the clutch-shaft with the shaft passing through the hollow standard, a line-shaft mounted on the track-frame and engaging the shaft of the hollow standard, an endless chain on the track-frame connecting the carriage and actuated by the said line-shaft, a clutch engaging the latter, means for disengaging the said clutch on the outward movement of the carriage, means for disengaging the said clutch on the inward movement of the carriage, means carried on the standard-frame for disengaging the elevating-clutch, and means actuated by the carriage for tripping the elevating-clutch to effect its engagement for the purpose stated.

36. In a machine for gathering and delivering glass, and in combination with a track-frame having a hinged section, a carriage upon said frame and a gathering instrument upon said carriage, mechanism for reciprocating the carriage, mechanism for rotating the gathering instrument, a clutch on said track-frame, and means for actuating it for controlling the reciprocating movements of the carriage, a base structure, means mounted in said base structure for carrying the track-frame, mechanism in the base structure for elevating the track-frame, coöperating mechanism on the base structure and on the hinged frame-section whereby the elevating and lowering movements of the track-frame control the pitch of the gathering instrument, a clutch in the base structure, and means whereby it is actuated to control the elevating and lowering movements of the track-frame.

37. In a machine for gathering and delivering glass, and in combination with a track-frame having a hinged section, an arm having a roll depending therefrom, a carriage and a gathering instrument thereon, a hollow standard-frame on which said track-frame is supported, a base structure upon which said standard is mounted, a shaft passing through said hollow standard, having a gear 54 on its lower end and supported in the base structure, a shaft therein having cranks and rods connecting them with the hollow standard, a shaft above the crank-shaft having a clutch-gear 44 49 connecting the clutch-shaft with a vertical shaft 50, having gear 53 engaging a gear 54 on the central shaft, whereby the latter is connected with the clutch-shaft, and gear connecting the crank and the clutch shafts, a line-shaft mounted on the track-frame, gear 35 and 36 connecting the line and central shafts, an endless chain on the track-frame and the gear 55 and 56 connecting the line-shaft and chain, a clutch on the line-shaft, the clutch-lever 65, the lever 75 on the carriage for disengaging said clutch, on the outward movement of the carriage, the pivoted arm 78 on the track-frame and the rod 77 connecting it with the clutch-lever 65, and the pivoted arm 79 on the carriage for disengaging said clutch on the inward movement of the carriage, a stop 80 on the base structure, for tripping the arm 79 for again engaging said clutch, an arm 104 on the standard-frame, and a lever device 96 100 on the base structure, for disengaging the clutch 95 on the descent of the track-frame, the lever 105 on the base structure engaging the lever part 100, the bell-crank 102 on the track-frame arranged to engage the lever 105, and a projection 107 on the carriage adapted to engage said bell-crank lever whereby to trip the lever part 100 to allow the engagement of the clutch for elevating the track-frame simultaneously with the advance of the carriage.

38. In a machine for gathering and delivering glass, and in combination with a track-frame, a carriage thereon, means for reciprocating it, a swing-frame pivotally mounted upon the carriage, a gathering instrument upon the swing-frame, means whereby it is rotated, and means whereby the swing-frame is held from being turned out of alinement with the carriage by the sticky pulling action of the glass in being wound upon the instrument.

39. In a machine for gathering and delivering glass, and in combination with a track-frame, a carriage thereon, means for reciprocating it, a swing-frame pivoted on the carriage, a gathering instrument upon the swing-frame, and means for rotating it, an arm on the swing-frame, and a fender device on the track-frame whereby the said arm and fender coact to prevent the swing-frame from being turned on its pivot to one side by the pulling action of the glass upon the rotating instrument during its gathering function.

40. In a machine for gathering and delivering glass, and in combination with a track-frame, a carriage thereon and means for reciprocating it, a gathering instrument on the carriage, and means for rotating it, a fixed concave fulcrum-bar, and means connecting the track-frame adapted to travel upon said concave for controlling the gathering end of the instrument, a base structure, means mounted therein for slidably supporting the track-frame, a crank-shaft and mechanism connecting it with said slidable frame, and mechanism whereby said crank-shaft by the length of its cranks is caused to effect and determine the elevation and lowering of the track-frame.

41. In a glass-gathering machine, a traveling carriage reciprocating toward and from the furnace, a rotating gathering-tool mounted on the carriage, and a lift by which that end of the carriage farthest from the furnace is raised and the tool thereby presented to the glass.

42. In a glass-gathering machine, the combination of a rotary gathering-tool, a reciprocating tool-bearing carriage, means for raising and inclining the carriage, to impart to the tool a high pitch relatively to the glass, and means for lowering the carriage to permit of the retraction of the tool in substantially a horizontal line.

43. A glass-gathering machine having a lifting track-frame, provided with a hinged or dipping section.

44. A glass-gathering machine having a lifting track-frame, provided with a hinged or dipping section, and a supporting-guide for said hinged section arranged to control the angle of the dipping motion.

45. In a glass-gathering machine, and in combination, a rotating gathering-tool, means for advancing it to and for retracting it from the glass, means for accelerating the rotation as the tool is being withdrawn from the glass with the charge, means for advancing said tool as it rises from the glass, and means whereby the tool is laterally swung out with the charge under its normal rotating speed.

46. In a glass-gathering machine, a gathering-tool and mechanism whereby it is caused to have a high pitch relatively to the glass, an advancing movement as it rises from the glass, an accelerating movement as it is rising with the charge, and a normal speed of rotation to deliver the charge.

47. In a glass-gathering machine, and in combination, a rotating gathering-tool, a carriage reciprocating toward and from the furnace, a track-frame for said carriage, a lift for the track-frame, and means operating simultaneously with the lift whereby the carriage is retained and supported on the track with its rear end higher than its front end.

48. In a glass-gathering machine, and in combination, a rotating gathering-tool, a carriage reciprocating toward and from the furnace, a jointed track-frame for said carriage, a lift for said track-frame, means connected with the latter whereby the rear end of the carriage is raised with the lift while the front end of the carriage is caused to be depressed by the lift, means whereby the gathering-tool is rotated, and means whereby the carriage is maintained on the inclined track.

49. In a glass-gathering machine, and in combination, a rotating gathering-tool and a track-frame of two connected parts, a lift constructed and arranged to raise and to lower one part of said frame in a horizontal position and means actuated by said lift to lower the other track part with its carriage from a horizontal to an inclined position.

50. In a glass-gathering machine and in combination a rotating gathering-tool, a carriage therefor, a track-frame of two jointed parts, a lift therefor and a device for supporting the tool-carrying part in moving from a horizontal to a downward inclined position substantially as described.

51. In a glass-gathering machine, and in combination, a rotating gathering-tool, a carriage therefor, a track-frame of two jointed parts a lift whereby one track part is lifted in a horizontal position, the other track part falling at the same time to an inclined position, a support for said falling part, and means whereby the carriage is transferred from the horizontal to the falling track part.

52. In a glass-gathering machine, in combination, a rotary gathering-tool, a carriage therefor, a track-frame of two jointed parts, a lift, one of said parts supported by said lift in a horizontal position, and an inclined guide controlling the flexure of the other jointed part.

53. In a glass-gathering machine, and in combination, a rotating gathering-tool, a carriage therefor, a track-frame of two jointed parts, a vertically-acting lift-support for one track part and a curved support for the other track part, whereby to control the positions assumed by the gathering-tool.

54. In a glass-gathering machine, and in combination, a rotating tool a carriage therefor, a track-frame of two joint-connected parts, a vertical support for one track part at one side of the connection and a curved support for the other track part at the other side of the joint connection, and a lift by which the rear end of the carriage is raised and the tool is presented to the glass at any inclination.

55. In a glass-gathering machine, and in combination, a rotating gathering-tool, a carriage therefor, a track-frame of two joint-connected parts, a vertical support for one track part, a curved support for the other track part, and a lift for the track-frame, both supports having such relation to each other that the said track-frame parts will be maintained thereby in horizontal alinement in the movement of the carriage thereon to deliver the charge.

56. In a glass-gathering machine, and in combination, a rotating gathering-tool, a carriage therefor, means for reciprocating it, a track-frame of two jointed parts, a central support for one track part and mechanism for raising and lowering it in a plane at right angles to said support, and a curved support constructed and arranged to cause the other track part to be raised with the carriage
5 thereon and in such movement to describe at its free end an arc struck from the joint of the track parts.

In testimony whereof I affix my signature in presence of two witnesses.

WILLIAM FRANCIS ALTENBAUGH.

Witnesses:
HARRY TAGGART,
GEORGE BEATTY.